(12) United States Patent
Hu et al.

(10) Patent No.: US 11,598,974 B2
(45) Date of Patent: Mar. 7, 2023

(54) OPTICAL ELEMENT DRIVING MECHANISM

(71) Applicant: TDK TAIWAN CORP., Taoyuan (TW)

(72) Inventors: Hsiao-Hsin Hu, Taoyuan (TW);
He-Ling Chang, Taoyuan (TW);
Chao-Hsi Wang, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 224 days.

(21) Appl. No.: 17/067,063

(22) Filed: Oct. 9, 2020

(65) Prior Publication Data

US 2021/0109368 A1   Apr. 15, 2021

Related U.S. Application Data

(60) Provisional application No. 62/912,743, filed on Oct. 9, 2019.

(51) Int. Cl.
*G02B 27/64* (2006.01)
*G02B 7/08* (2021.01)

(52) U.S. Cl.
CPC ............ *G02B 27/646* (2013.01); *G02B 7/08* (2013.01)

(58) Field of Classification Search
CPC ........ G02B 27/646; G02B 7/08; G02B 27/64; G02B 7/04; G02B 5/005; H04N 5/23248; H04N 5/23264; H04N 5/2328; H04N 5/23287; H04N 5/2257; G03B 2217/005; G03B 2205/00; G03B 9/06; G03B 5/06; G03B 13/36; G03B 9/02; G03B 9/07; G03B 9/08; G03B 9/00
USPC ....... 359/557, 554, 227, 230, 232, 233, 894; 250/201.1, 201.2, 201.4; 348/208.99, 348/208.2, 208.12; 396/52, 55, 449, 450, 396/451, 452, 458, 461, 462, 463, 464, 396/469, 479, 480, 481, 483, 484, 485, 396/486, 487, 488, 489, 490, 491, 492, 396/505, 508
See application file for complete search history.

(56) References Cited

U.S. PATENT DOCUMENTS

2019/0377238 A1* 12/2019 Kim .......................... G03B 5/04
2020/0064711 A1*  2/2020 Kim .......................... G03B 9/06

* cited by examiner

*Primary Examiner* — Arnel C Lavarias
(74) *Attorney, Agent, or Firm* — Muncy, Geissler, Olds & Lowe, P.C.

(57) ABSTRACT

An optical element driving mechanism is provided. The optical element driving mechanism includes a fixed portion, a first blade, a transmission assembly, and a driving assembly. The first blade is movable relative to the fixed portion. The transmission assembly is movable relative to the fixed portion. The driving assembly is used for driving the transmission element to move relative to the fixed portion. The transmission element brings the first blade to move relative to the fixed portion when the transmission element is driven by the driving assembly.

10 Claims, 18 Drawing Sheets

OPTICAL ELEMENT DRIVING MECHANISM

CROSS REFERENCE TO RELATED APPLICATIONS

This application claims the benefit of U.S. Provisional Application No. 62/912,743, filed on Oct. 9, 2019, the entirety of which is incorporated by reference herein.

BACKGROUND OF THE DISCLOSURE

Field of the Disclosure

The present disclosure relates to an optical element driving mechanism.

Description of the Related Art

As relevant technologies have been developed and improved, many electronic devices (such as cameras and smartphones) can record images and videos. However, when a lens having a long focal length is provided in the electronic device, the thickness of the device may be increased, which can adversely impede the prospects for miniaturizing the electronic device. Furthermore, conventional micro image capturing modules are mainly designed to have an aperture with a fixed diameter, and the image sharpness and photosensitivity of most small mobile electronic devices are not adjustable. A smaller aperture is required to achieve better image quality if the sensor supports it and if there is enough light. However, if the size of the aperture is fixed and has a small size, image quality will be low when there is not enough light (e.g. at night). As a result, the image capturing ability under different environments will be sacrificed if the diameter of the aperture is fixed.

BRIEF SUMMARY OF DISCLOSURE

An optical element driving mechanism is provided. The optical element driving mechanism includes a fixed portion, a first blade, a transmission assembly, and a driving assembly. The first blade is movable relative to the fixed portion. The transmission assembly is movable relative to the fixed portion. The driving assembly is used for driving the transmission element to move relative to the fixed portion. The transmission element brings the first blade to move relative to the fixed portion when the transmission element is driven by the driving assembly.

In some embodiments, the optical element driving mechanism further includes a second blade movable relative to the fixed portion, a third blade movable relative to the fixed portion, and a fourth blade movable relative to the fixed portion. The fixed portion includes a first opening, a second opening, a third opening, a fourth opening, and a fifth opening that allow light to pass through. The first opening, the second opening, the third opening, the fourth opening, and the fifth opening are all different sizes.

In some embodiments, the first opening is closer to a light incident position than the second opening. The second opening is closer to the light incident position than the third opening. The third opening is closer to the light incident position than the fourth opening. The fourth opening is closer to the light incident position than the fifth opening. A main axis of the light sequentially passes through the first opening, the second opening, the third opening, the fourth opening, and the fifth opening.

In some embodiments, the minimum diameter of the first opening is greater than the minimum diameter of the second opening. The minimum diameter of the second opening is less than the minimum diameter of the third opening. The minimum diameter of the third opening is less than the minimum diameter of the fourth opening. The minimum diameter of the fourth opening is less than the minimum diameter of the fifth opening. The minimum diameter of the first opening is less than the minimum diameter of the third opening.

In some embodiments, the first opening includes a first opening surface facing the main axis. The second opening includes a second opening surface facing the main axis. The third opening includes a third opening surface facing the main axis. The fourth opening includes a fourth opening surface facing the main axis. The fifth opening includes a fifth opening surface facing the main axis. The first opening surface, the second opening surface, the third opening surface, the fourth opening surface, and the fifth opening surface are arranged in order.

In some embodiments, the first opening surface is parallel to the main axis. The second opening surface is not parallel to the main axis. The third opening surface is not parallel to the main axis. The fourth opening surface is parallel to the main axis. The fifth opening surface is parallel to the main axis. When viewed in a first direction that is perpendicular to the main axis, the first opening surface is not parallel to the second opening surface.

In some embodiments, the first blade, the second blade, the third blade, and the fourth blade form an aperture opening for the light to pass through. The minimum diameter of the aperture opening is less than the minimum diameter of the second opening. A maximum diameter of the aperture opening is greater than the minimum diameter of the second opening. The first blade, the second blade, the third blade, and the fourth blade move in different directions.

In some embodiments, the first blade and the third blade move in opposite directions. The second blade and the fourth blade move in opposite directions. The first blade includes a first blade opening. The second blade includes a second blade opening. The third blade includes a third blade opening. The fourth blade includes a fourth blade opening. At least a portion of the transmission element is disposed in the first blade opening, the second blade opening, the third blade opening, and the fourth blade opening.

In some embodiments, the first blade includes a top surface and a bottom surface. The second blade includes a top surface, a bottom surface, and a recessed point. The roughness of the top surface of the first blade is less than the roughness of the bottom surface of the first blade. The reflectivity of the top surface of the first blade is higher than the reflectivity of the bottom surface of the first blade. The roughness of the top surface of the second blade is less than the roughness of the bottom surface of the second blade. The reflectivity of the top surface of the second blade is higher than the reflectivity of the bottom surface of the second blade. The recessed point of the second blade recesses to the first blade and is in direct contact with the first blade. The first blade is disposed on the second blade, and the distance between the bottom surface of the first blade and the top surface of the second blade is greater than zero.

In some embodiments, the optical element driving mechanism further including an electronic assembly disposed on the fixed portion. The fixed portion includes a bottom plate, a base disposed on the bottom plate, a frame disposed on the base, and a case disposed on the frame. The driving assembly includes a magnetic element and a coil. At least a portion of the frame is exposed from the case when viewed along the main axis. The electronic assembly is disposed in the coil. The distance between a top surface of the electronic assembly and the magnetic element is longer than the top surface of the coil and the magnetic element.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
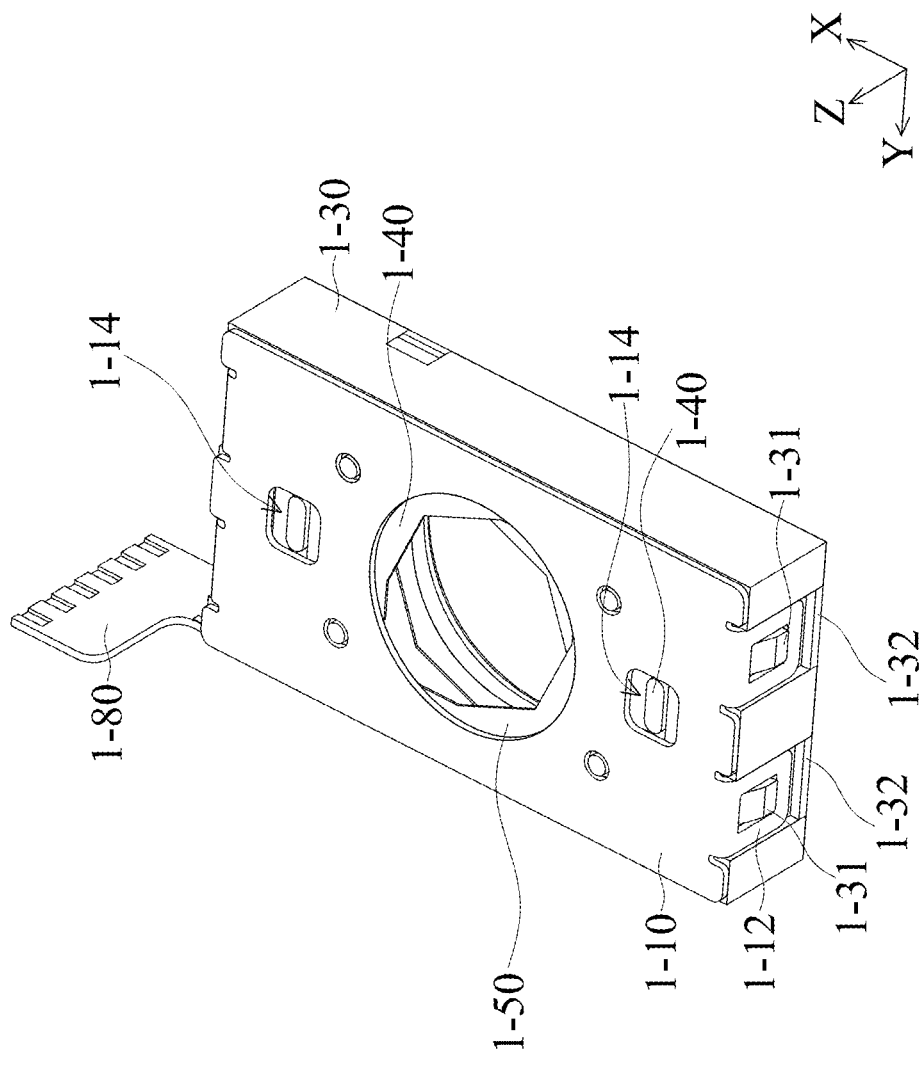
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
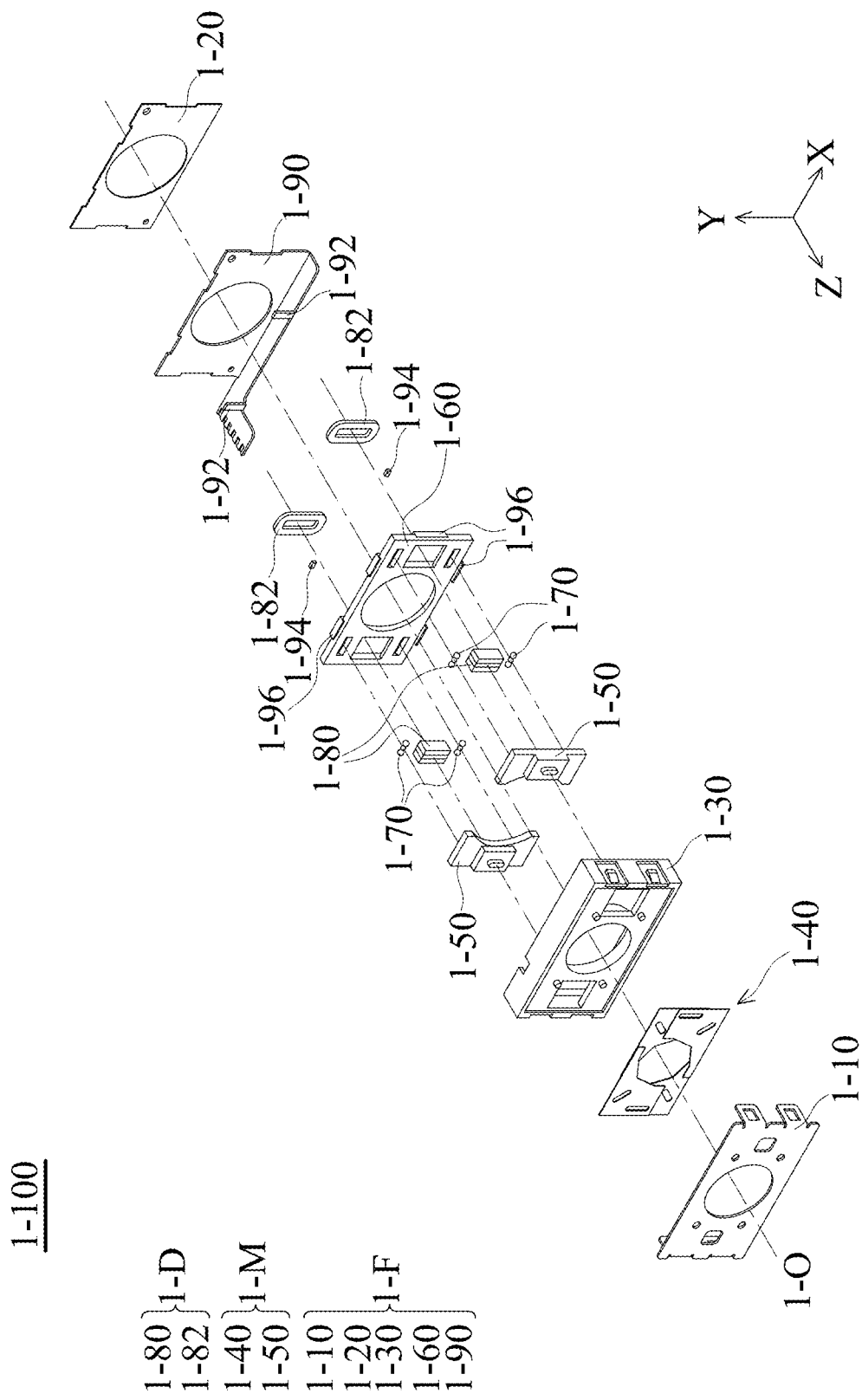
FIG. 2 is an exploded view of the optical element driving mechanism.
Figure 3:
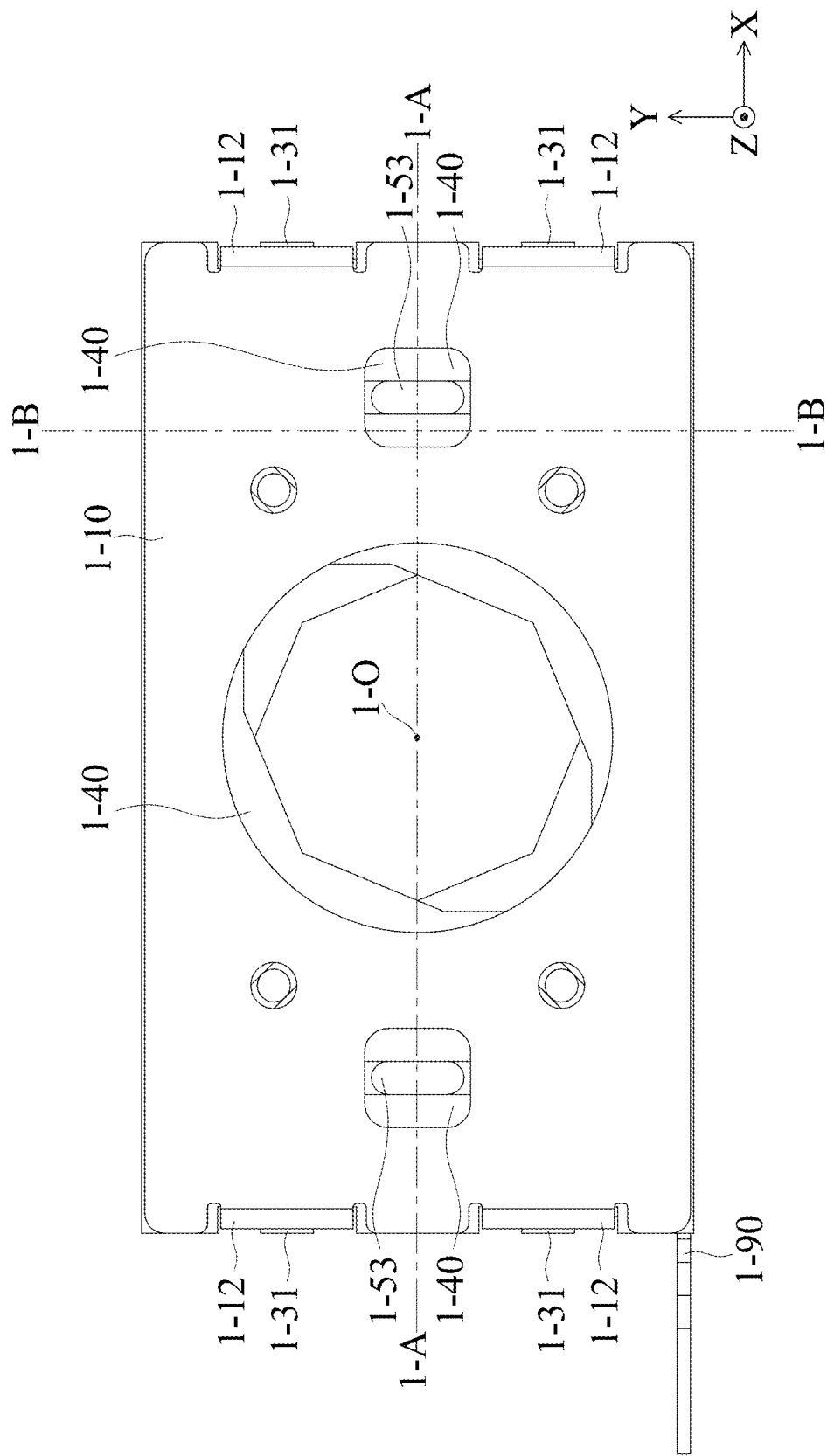
FIG. 3 is a top view of the optical element driving mechanism.
Figure 4A:
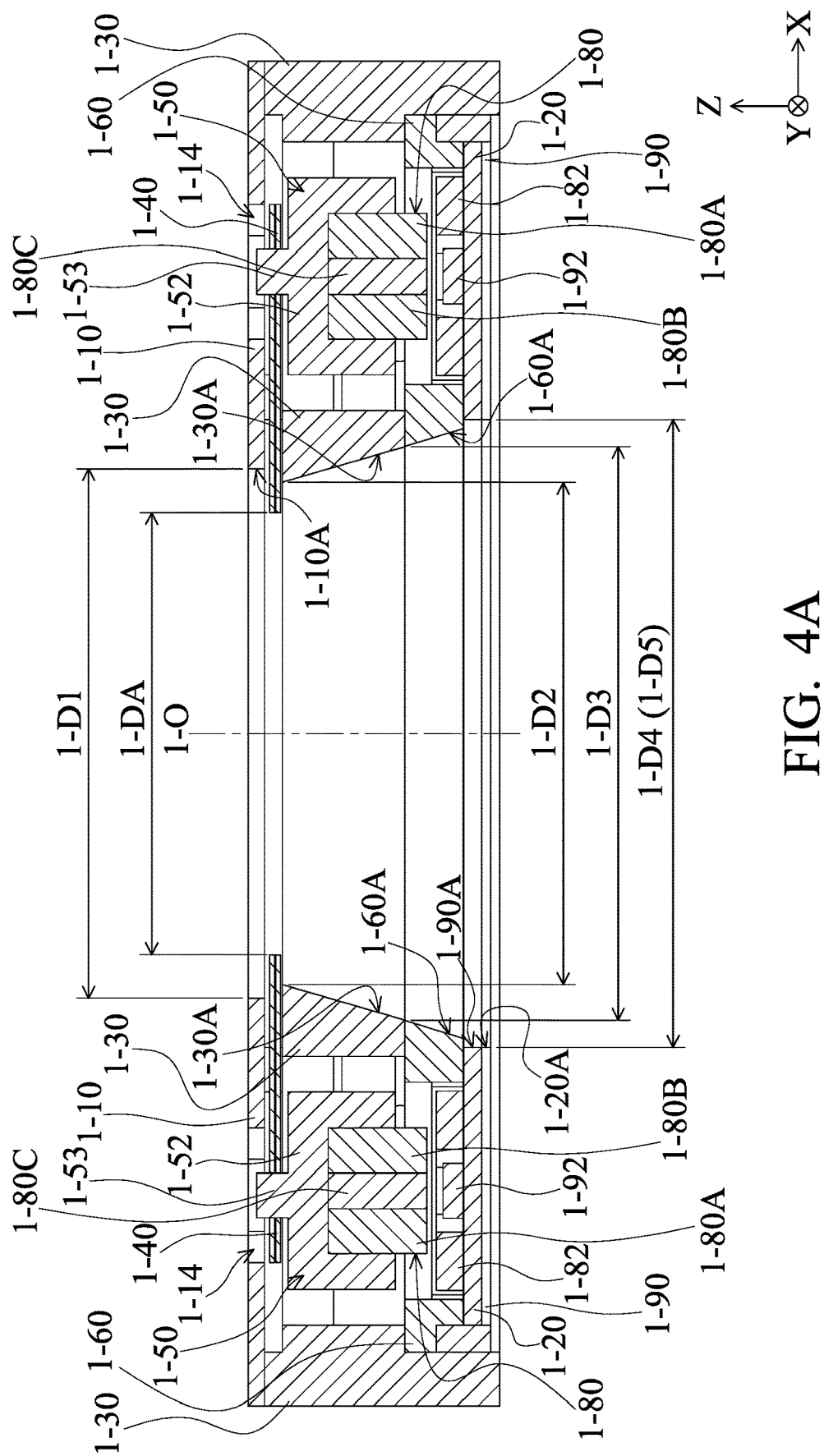
FIG. 4A is a cross-sectional view illustrated along line 1-A-1-A in FIG. 3.
Figure 4B:
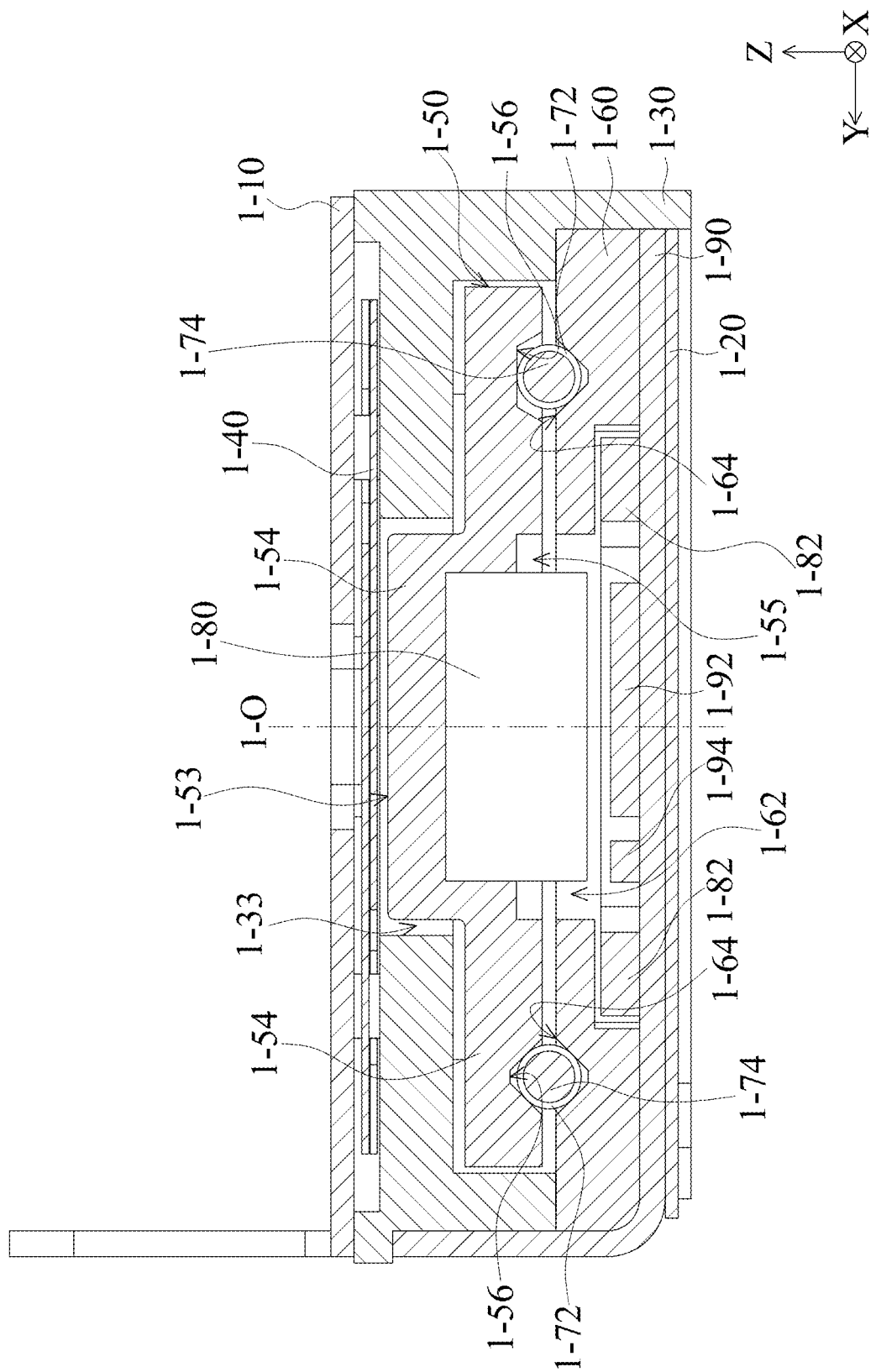
FIG. 4B is a cross-sectional view illustrated along line 1-B-1-B in FIG. 3.

Refer to FIG. 1 to FIG. 4B. FIG. 1 is a schematic view of the optical element driving mechanism 1-100 in some embodiments of the present disclosure. FIG. 2 is an exploded view of the optical element driving mechanism. FIG. 3 is a top view of the optical element driving mechanism 1-100. FIG. 4A is a cross-sectional view illustrated along line 1-A-1-A in FIG. 3. FIG. 4B is a cross-sectional view illustrated along line 1-B-1-B in FIG. 3.

For example, the optical element driving mechanism 1-100 may be an aperture or a shutter, and may mainly include a case 1-10, a bottom plate 1-20, a frame 1-30, a blade assembly 1-40, a transmission element 1-50, a base 1-60, a support assembly 1-70, a magnetic element 1-80, a coil 1-82, a circuit board 1-90, an electronic assembly 1-92, a sensor 1-94, and binding elements 1-96.

In some embodiments, the case 1-10, the bottom plate 1-20, the frame 1-30, the base 1-60, the circuit board 1-90 may be called as a fixed portion 1-F. The blade assembly 1-40 and the transmission element 1-50 may be called as a movable portion 1-M which is movable relative to the fixed portion 1-F. The magnetic element 1-80 and the coil 1-82 may be called as a driving assembly 1-D used for driving the transmission element 1-50 to move relative to the fixed portion 1-F.

The frame 1-30 may be disposed between the case 1-10 and the bottom plate 1-20, and the blade assembly 1-40 may be disposed on the frame 1-30. The transmission element 1-50 may be disposed on the blade assembly 1-40 and passes through the case 1-10, the frame 1-30, and the base 1-60. The support assembly 1-70 may be disposed on the transmission element 1-50 and used for bringing the transmission element 1-50 to move relative to the fixed portion 1-F.

The magnetic element 1-80 may be disposed on the transmission element 1-50, and may move with the transmission element 1-50. The coil 1-82 may be disposed on the base 1-60. An electromagnetic force may be generated between the coil 1-82 and the magnetic element 1-80 when current is provided to the coil 1-82. The transmission element 1-50 (and the blade assembly 1-40 disposed thereon) may be moved by the electromagnetic force. In some embodiments, the position of the magnetic element 1-80 and the coil 1-82 are interchangeable.

The electronic assembly 1-92 and the sensor 1-94 may be disposed in the coil 1-82 to detect the position of the magnetic element 1-80 relative to the fixed portion 1-F to control the optical element driving mechanism 1-100. The sensor 1-94 or the sensor in the electronic assembly 1-92 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the circuit on the circuit board 1-90 is electrically connected to other electronic elements disposed inside or outside the optical element driving mechanism 1-100, so the optical element driving mechanism 1-100 may be controlled.

In some embodiments, as shown in FIG. 1 and FIG. 3, the case 1-10 may include a first binding portion 1-12, and the frame 1-30 may include a second binding portion 1-31. The first binding portion 1-12 has an opening, and the second binding portion 1-31 may be disposed in the opening to fix the relative position between the case 1-10 and the frame 1-30. In other words, when viewed along the main axis 1-O, at least a portion of the second binding portion 1-31 is exposed from the case 1-10.

shown in FIG. 4A, the case 1-10 includes a first opening surface 1-10A, the frame 1-30 includes a second opening surface 1-30A, the base 1-60 includes a third opening surface 1-60A, the circuit board 1-90 includes a fourth opening surface 1-90A, the bottom plate 1-20 includes a fifth opening surface 1-20A, used for defining a first opening, a second opening, a third opening, a fourth opening, a fifth opening, respectively. For example, the openings may be defined as the area surrounded by the opening surfaces.

The first opening surface 1-10A, the second opening surface 1-30A, the third opening surface 1-60A, the fourth opening surface 1-90A, and the fifth opening surface 1-20A face the main axis 1-O. In some embodiments, the first opening surface 1-10A is parallel to the main axis 1-O, the second opening surface 1-30A is not parallel to the main axis 1-O, the third opening surface 1-60A is not parallel to the main axis 1-O, the fourth opening surface 1-90A is parallel to the main axis 1-O, and the fifth opening surface 1-20A is parallel to the main axis 1-O. As shown in FIG. 4A, when viewed in a first direction (the Y direction), the first opening surface 1-10A is not parallel to the second opening surface 60A. In some embodiments, the third opening surface 1-30A and the fourth opening surface 60A extend continuously and form a tapered surface to control the light path passing through the optical element driving mechanism 1-100.

The minimum diameters of the first opening, the second opening, the third opening, the fourth opening, and the fifth opening are 1-D1, 1-D2, 1-D3, 1-D4, 1-D5, respectively. The first opening, the second opening, the third opening, the fourth opening, and the fifth opening are used for allowing light to pass through. It should be noted that the first opening is closer to a light incident position (such as the position close to the case 1-10 at the top of FIG. 4A) than the second opening. The second opening is closer to the light incident position than the third opening. The third opening is closer to the light incident position than the fourth opening. The fourth opening is closer to the light incident position than the fifth opening. The main axis 1-O passes through the first opening, the second opening, the third opening, the fourth opening, the fifth opening sequentially.

It should be noted that the minimum diameter 1-D1 of the first opening is greater than the minimum diameter 1-D2 of the second opening. The minimum diameter 1-D2 of the second opening is less than the minimum diameter 1-D3 of the third opening. The minimum diameter 1-D3 of the third opening is less than the minimum diameter 1-D4 of the fourth opening. The minimum diameter 1-D4 of the fourth opening is less than the minimum diameter 1-D5 of the fifth opening. The minimum diameter 1-D1 of the first opening is less than the minimum diameter 1-D3 of the third opening. In some embodiments, the minimum diameter 1-D4 of the fourth opening may be equal to the minimum diameter 1-D5 of the fifth opening.

The case 1-10 may include an opening 1-14, and a portion of the transmission element 1-50 may be disposed in the opening 1-14 to pass through the blade assembly 1-40. The magnetic element 1-80 may include a first magnetic element 1-80A, a second magnetic element 1-80B, and a separating element 1-80C. The first magnetic element 1-80 and the second magnetic element 1-80B may be magnets having different magnetic pole directions, such as opposite directions. The separating element 1-80C may separate the first magnetic element 1-80A and the second magnetic element 1-80B.

In some embodiments, as shown in FIG. 4A, the top surface of the electronic assembly 1-92 may be lower than the top surface of the coil 1-82. In other words, the distance between the top surface of the electronic assembly 1-92 and the magnetic element 80 is longer than the distance between the top surface of the coil 1-82 and the magnetic element 1-80. Therefore, collision of the electronic assembly 1-92 may be prevented.

Figure 5A:
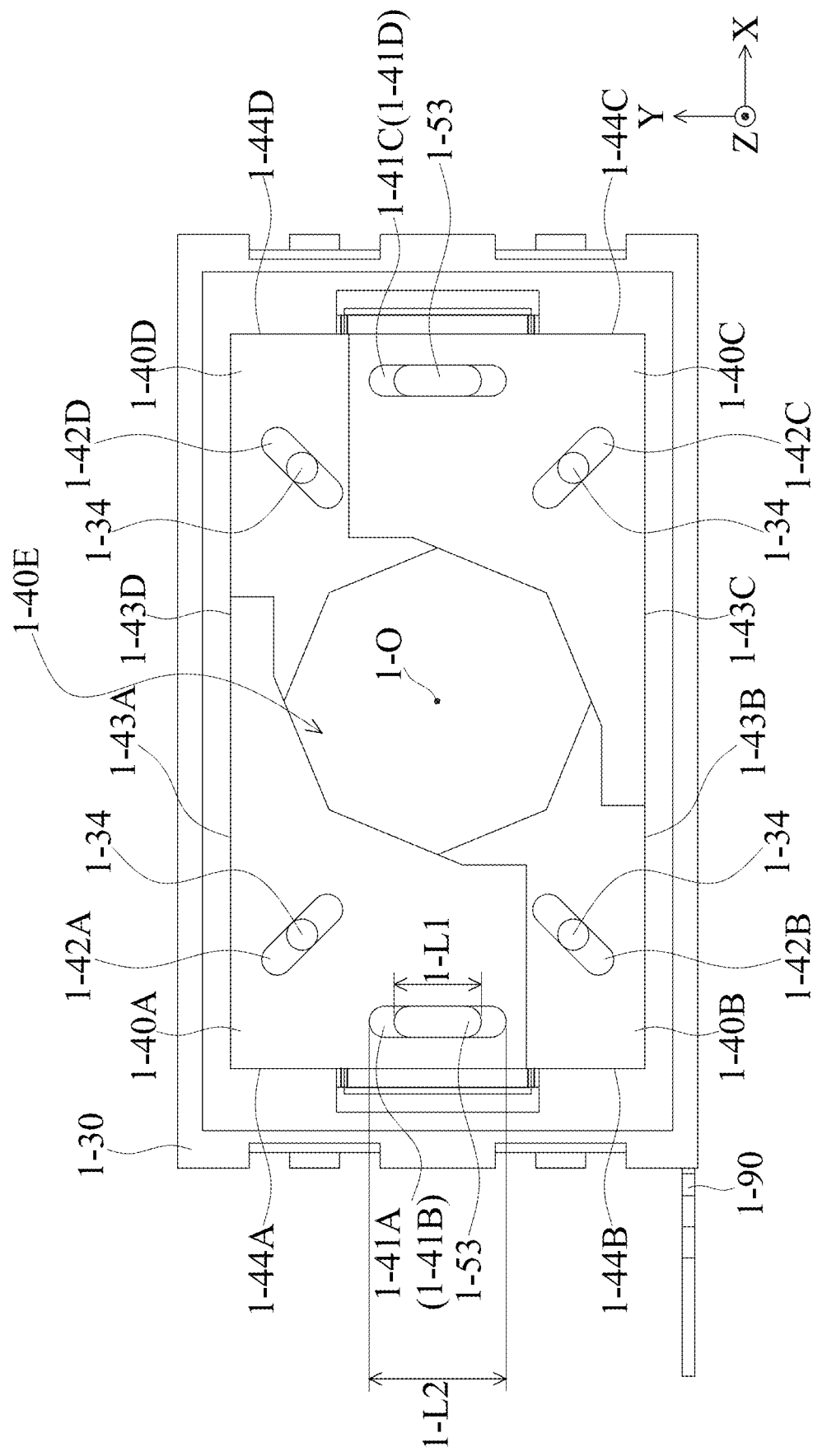
FIG. 5A is a schematic view of the optical element driving mechanism, wherein the case is omitted.

FIG. 5A is a schematic view of the optical element driving mechanism 1-100 when the case 1-10 is omitted. As shown in FIG. 5A, the first blade assembly 1-40 may include a first blade 1-40A, a second blade 1-40B, a third blade 1-40C, and a fourth blade 1-40D. The first blade 1-40A, the second blade 1-40B, the third blade 1-40C, and the fourth blade 1-40D form an aperture opening 1-40E that allows the light to pass through the optical element driving mechanism 1-100. The first blade 1-40A includes a first blade opening 1-41A, the second blade 1-40B includes a second blade opening 1-41B, the third blade 1-40C includes a third blade opening 1-41C, and the fourth blade 1-40D includes a fourth blade opening 1-41D. The openings extend in the Y direction.

A connecting portion 1-53 of one of the transmission elements 1-50 passing through the first blade opening 1-41A and the second blade opening 1-41B, and the connecting portion 1-53 of another transmission elements 1-50 passing through the third blade opening 1-41C and the fourth blade opening 1-41D. In some embodiments, the first blade opening 1-41A overlaps the entire second blade opening 1-41B, and the third blade opening 1-41C overlaps the entire fourth blade opening 1-41D. For example, the openings may have an identical length 1-L2, the connecting portion 1-53 includes a length 1-L1, and the length 1-L1 is less than the length 1-L2. Therefore, the transmission element 1-50 may move in the blade openings relative to the blades through the connecting portion 1-53.

Moreover, the blades may include guiding openings extending to the main axis 1-O. For example, the first blade 1-40A includes a first guiding opening 1-42A, the second blade 1-40B includes a second guiding opening 1-42B, the third blade 1-40C includes a third guiding opening 1-42C, the fourth blade 1-40D includes a fourth guiding opening 1-42D. The guiding element 1-34 of the frame 1-30 may be disposed in the first guiding opening 1-42A, the second guiding opening 1-42B, the third guiding opening 1-42C, and the fourth guiding opening 1-42D to guide the movement directions of the first blade 1-40A, the second blade 1-40B, the third blade 1-40C, and the fourth blade 1-40D relative to the fixed portion 1-F.

The first guiding opening 1-42A, the second guiding opening 1-42B, the third guiding opening 1-42C, and the fourth guiding opening 1-42D extend in different directions, so the first blade 1-40A, the second blade 1-40B, the third blade 1-40C, and the fourth blade 1-40D may move in different directions. For example, the first guiding opening 1-42A and the third guiding opening 1-42C extend in opposite directions, and the second guiding opening 1-42B and the fourth guiding opening 1-42D extend in opposite directions. In other words, the first blade 1-40A and the third blade 1-40C move in opposite directions, and the second blade 1-40B and the fourth blade 1-40D extend in opposite directions.

Furthermore, as shown in FIG. 5A, the first blade 1-40A may include a side 1-43A and a side 1-44A, the second blade 1-40B may include a side 1-43B and a side 1-44B, the third blade 1-40C may include a side 1-43C and a side 1-44C, and the fourth blade 1-40 may include a side 1-43C and a side 1-44D. The sides 1-43A, 1-43B, 1-43C, and 1-43D may extend in a first direction (the X direction), the sides 1-44A, 1-44B, 1-44C, 1-44D may extend in a second direction (the Y direction), and the first direction and the second direction are different (e.g. perpendicular to each other).

When the blade assembly 1-40 of the optical element driving mechanism 1-100 is operating, the side 1-43A substantially overlaps the side 1-43D, the side 1-43B substantially overlaps the side 1-43C, the side 1-44A substantially overlaps the side 1-44B, and the side 1-44C substantially overlaps the side 1-44D. Therefore, the amount of movement of the blades in different directions may be substantially identical, and the shape of the aperture opening 1-40E may be maintained.

In some embodiments, the first blade 1-40A, the second blade 1-40B, the third blade 1-40C, and the fourth blade 1-40D may be plate-shaped. The first blade 1-40A and the third blade 1-40C may substantially be positioned on the same plane, and the second blade 1-40B and the fourth blade 1-40D may substantially be positioned on the same plane. In the top view, both of the first blade 1-40A and the third blade 1-40C cover a portion of the second blade 1-40B and the fourth blade 1-40D.

Figure 5B:
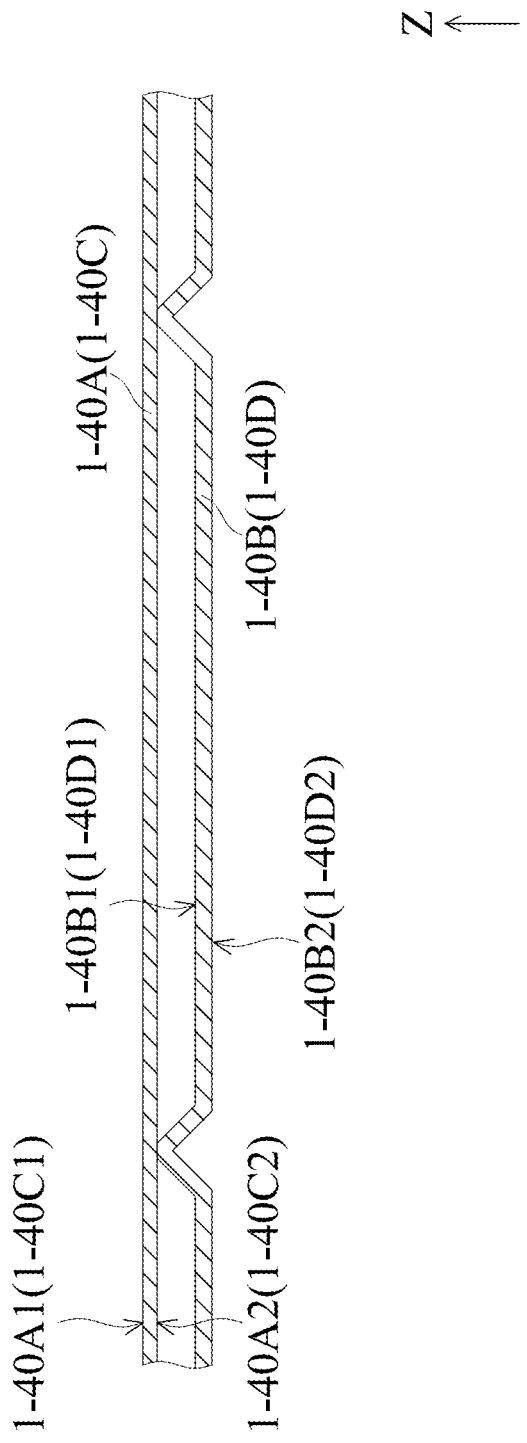
FIG. 5B is a cross-sectional view of a first blade, a second blade, a third blade, and a fourth blade.

FIG. 5B is a cross-sectional view of the first blade 1-40A, the second blade 1-40B, the third blade 1-40C, and the fourth blade 1-40D. The first blade 1-40A includes a top surface 1-40A1 and a bottom surface 1-40A2, the second blade 1-40B includes a top surface 1-40B1 and a bottom surface 1-40B2, the third blade 1-40C includes a top surface 1-40C1 and a bottom surface 1-40C2, and the fourth blade 1-40D includes a top surface 1-40D1 and a bottom surface 1-40D2. The roughness of the top surface 1-40A1 and the bottom surface 1-40A2 are different, the roughness of the top surface 1-40B1 and the bottom surface 1-40B2 are different, the roughness of the top surface 1-40C1 and the bottom surface 1-40C2 are different, the roughness of the top surface 1-40D1 and the bottom surface 1-40D2 are different. For example, the roughness of the top surface 1-40A1 may be less than the roughness of the bottom surface 1-40A2, the roughness of the top surface 1-40B1 may be less than the roughness of the bottom surface 1-40B2, the roughness of the top surface 1-40C1 may be less than the roughness of the bottom surface 1-40C2, and the roughness of the top surface 1-40D1 may be less than the roughness of the bottom surface 1-40D2. In other words, the reflectivity of the top surface 1-40A1 may be higher than the reflectivity of the bottom surface 1-40A2, the reflectivity of the top surface 1-40B1 may be higher than the reflectivity of the bottom surface 1-40B2, the reflectivity of the top surface 1-40C1 may be higher than the reflectivity of the bottom surface 1-40C2, and the reflectivity of the top surface 1-40D1 may be higher than the reflectivity of the bottom surface 1-40D2. Therefore, noise light may be prevented from being generated.

The first blade 1-40A and the third blade 1-40C may in contact with the second blade 1-40B and the fourth blade 1-40D by point contact to reduce the contact area and friction. For example, the second blade 1-40B and the fourth blade 1-40D may have points recessed toward the first blade 1-40A and the third blade 1-40C, and the second blade 1-40B and the fourth blade 1-40D are in contact with the first blade 1-40A and the third blade 1-40C through the recessed points. The surfaces of the second blade 1-40B and the fourth blade 1-40D are separated from the surfaces of the first blade 1-40A and the third blade 1-40C. For example, the distance from the bottom surface 1-40A2 or the bottom surface 1-40C2 to the top surface 1-40B1 or the top surface 1-40D1 is greater than zero. However, the present disclosure is not limited thereto. The first blade 1-40A and the third blade 1-40C may also have points that are recessed to the second blade 1-40B and the fourth blade 1-40D, depending on design requirements. In some embodiments, the number of recessed points on each blade may be greater than three (three points form a plane).

Figure 6:
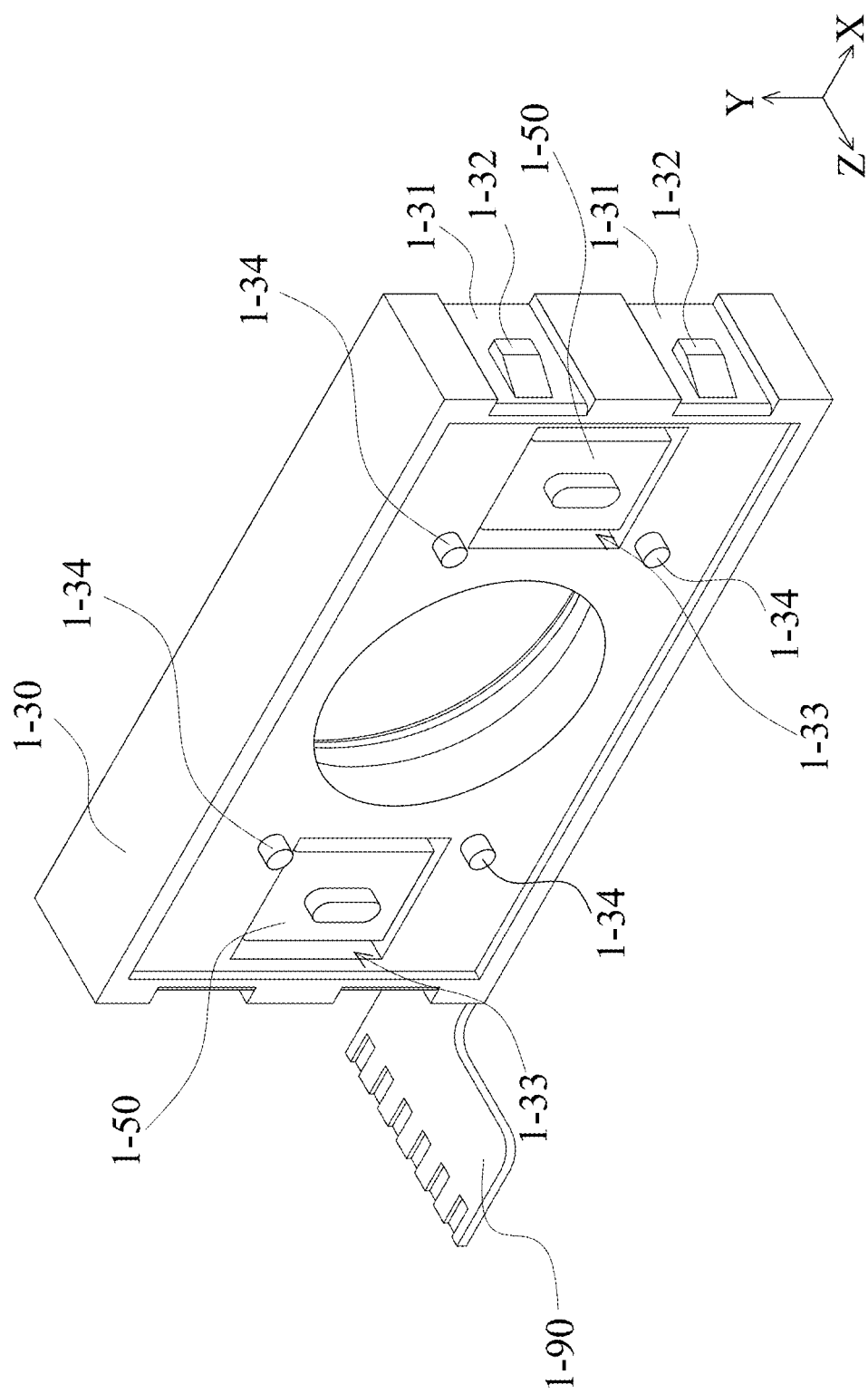
FIG. 6 is a schematic view of some elements of the optical element driving mechanism.

FIG. 6 is a schematic view of some elements of the optical element driving mechanism 1-100, wherein the case 1-10 and the blade assembly 1-40 are omitted. The frame 1-30 may include an opening 1-33 used for accommodating the transmission element 1-50. It should be noted that in the X direction, the size of the opening 1-33 may be greater than the size of the transmission element 1-50, so the transmission element 1-50 may move in the X direction relative to the frame 1-30.

Figure 7A:
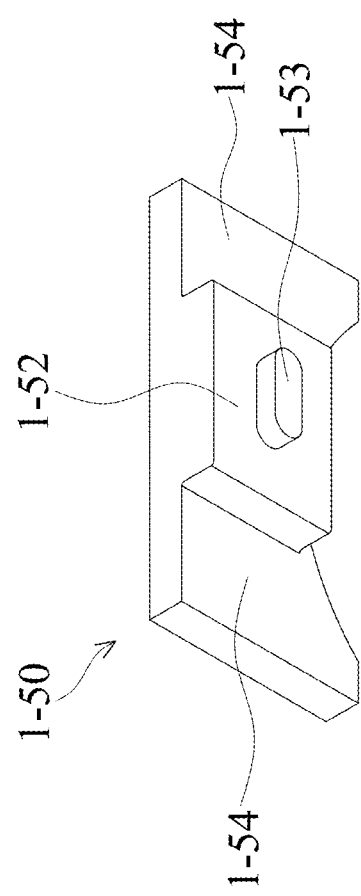
FIG. 7A and FIG. 7B are schematic views of the transmission viewed in different directions.
Figure 7B:
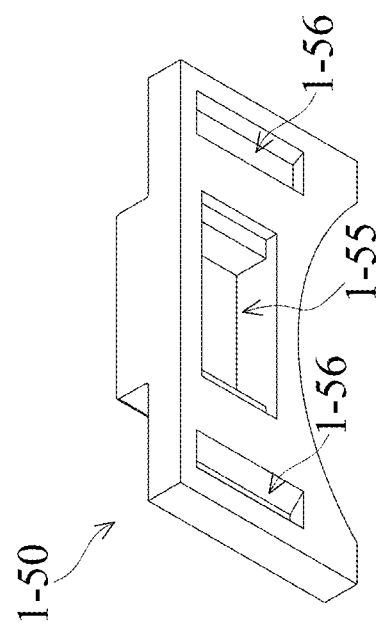

FIG. 7A and FIG. 7B are schematic views of the transmission element 1-50 when viewed in different directions. The transmission element 1-50 may include a main body 1-52, a connecting portion 1-53, extending portions 1-54, a first recess 1-55, and second recesses 1-56. The connecting portion 1-53 may extend from the main body 1-52 in the Z direction, and the extending portions 1-54 may extend from the main body 1-52 in the X direction. The first recess 1-55 may overlap the main body 1-52, and the second recesses may overlap the extending portions 1-54.

As shown in FIG. 4B, the magnetic element 1-80 may be disposed in the first recesses 1-55, and the first recess 1-55 may have a stepped shape in the cross-sectional view. Therefore, adhesive material (e.g. glue) may be disposed between the magnetic element 1-80 and the first recess 1-55 to affix the magnetic element 1-80 and the transmission element 1-50. It should be noted that the transmission element 1-50 is not in direct contact with the case 1-10, the frame 1-30, or the base 1-60 in the X direction, reducing friction.

Figure 8:
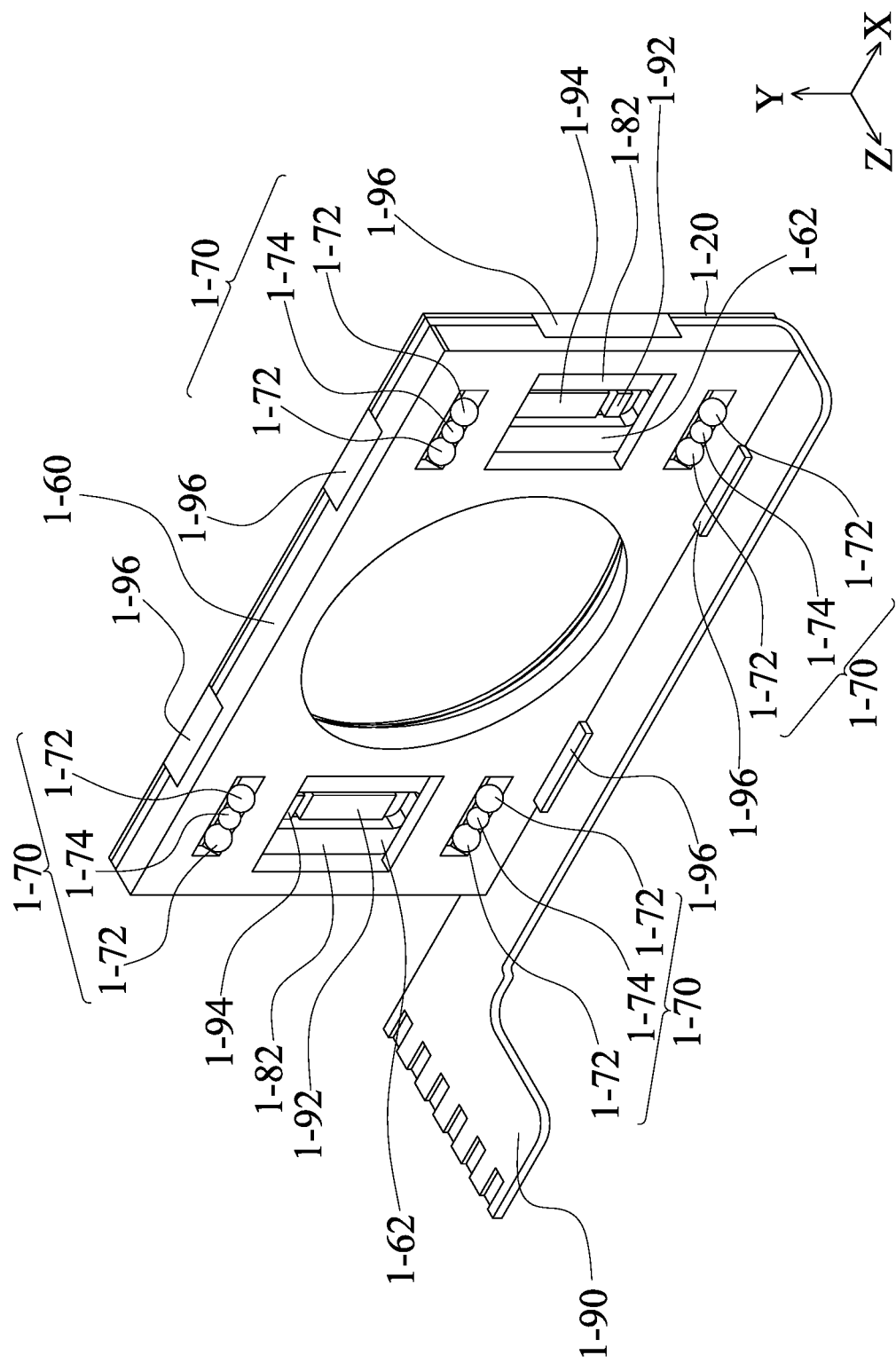
FIG. 8 is a schematic view of some elements of the optical element driving mechanism.

FIG. 8 is a schematic view of some elements of the optical element driving mechanism 1-100, wherein the frame 1-30 and the transmission elements 1-50 are omitted when compared with FIG. 6. The support assembly 1-70 may include two first support elements 1-72 and one second support element 1-74. The first support element 1-72 and the second support element 1-74 may be spherical, the diameter of the second support element 1-74 may be less than the diameter of the first support element 1-72, and may be disposed between the two first support elements 1-72 to reduce the friction when the first support elements 1-72 are rolling.

As shown in FIG. 4B and FIG. 8, a portion of the support assembly 1-70 may be disposed in the recess 1-64 of the base 1-60, and a portion of the support assembly 1-70 may be disposed in the second recess 1-56 to reduce the friction between the transmission element 1-50 and the base 1-60. Therefore, the transmission 1-50 may move relative to the base 1-60 more easily. However, the present disclosure is not limited thereto. Other support assembly with other configurations also may be applied, depending on design requirements.

As shown in FIG. 4B and FIG. 8, the base 1-60 may have a base opening 1-62, and the transmission element 1-50 and the magnetic element 1-80 disposed on the transmission element 1-50 may be disposed in the base opening 1-62. In FIG. 8, at least a portion of the coil 1-82, the electronic assembly 1-92, and the sensor 1-94 is exposed from the base opening 1-62 to interact with the magnetic field of the magnetic element 1-80. For example, an electromagnetic force may be generated, or variations in the magnetic field may be detected.

As shown in FIG. 8, the base 1-60, the circuit board 1-90, and the bottom plate 1-20 may be combined using binding elements 1-96. The binding elements 1-96 may be glue, and may be disposed at the sides of the base 1-60, the circuit board 1-90, and the bottom plate 1-20, such as disposed on all of the four sides. Different number of binding elements 1-96 may be provided on different sides of the base 1-60, the circuit board 1-90, and the bottom plate 1-20.

Figure 9A:
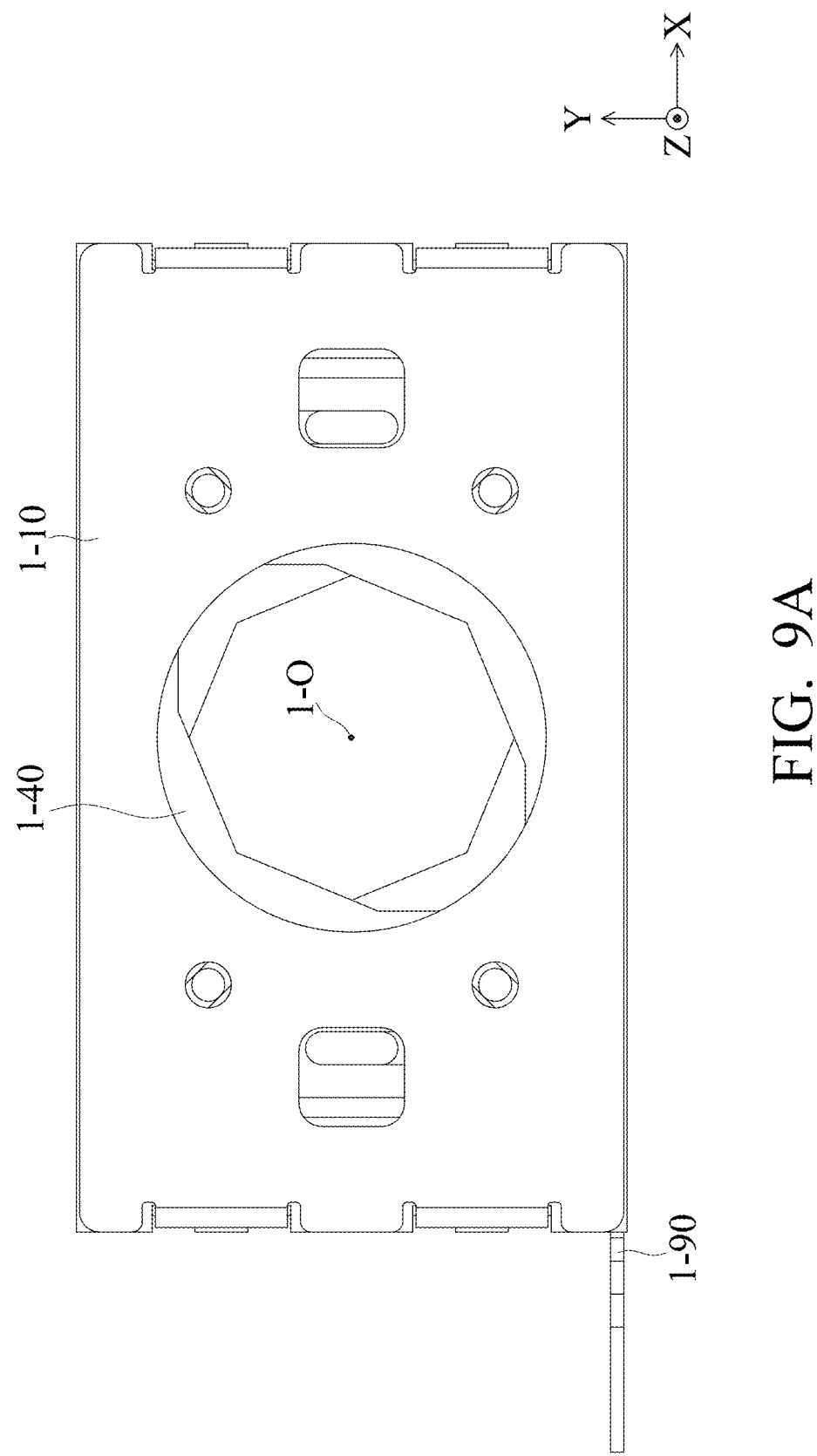
FIG. 9A is a top view of the optical element driving mechanism when the blade assembly is closed.
Figure 9B:
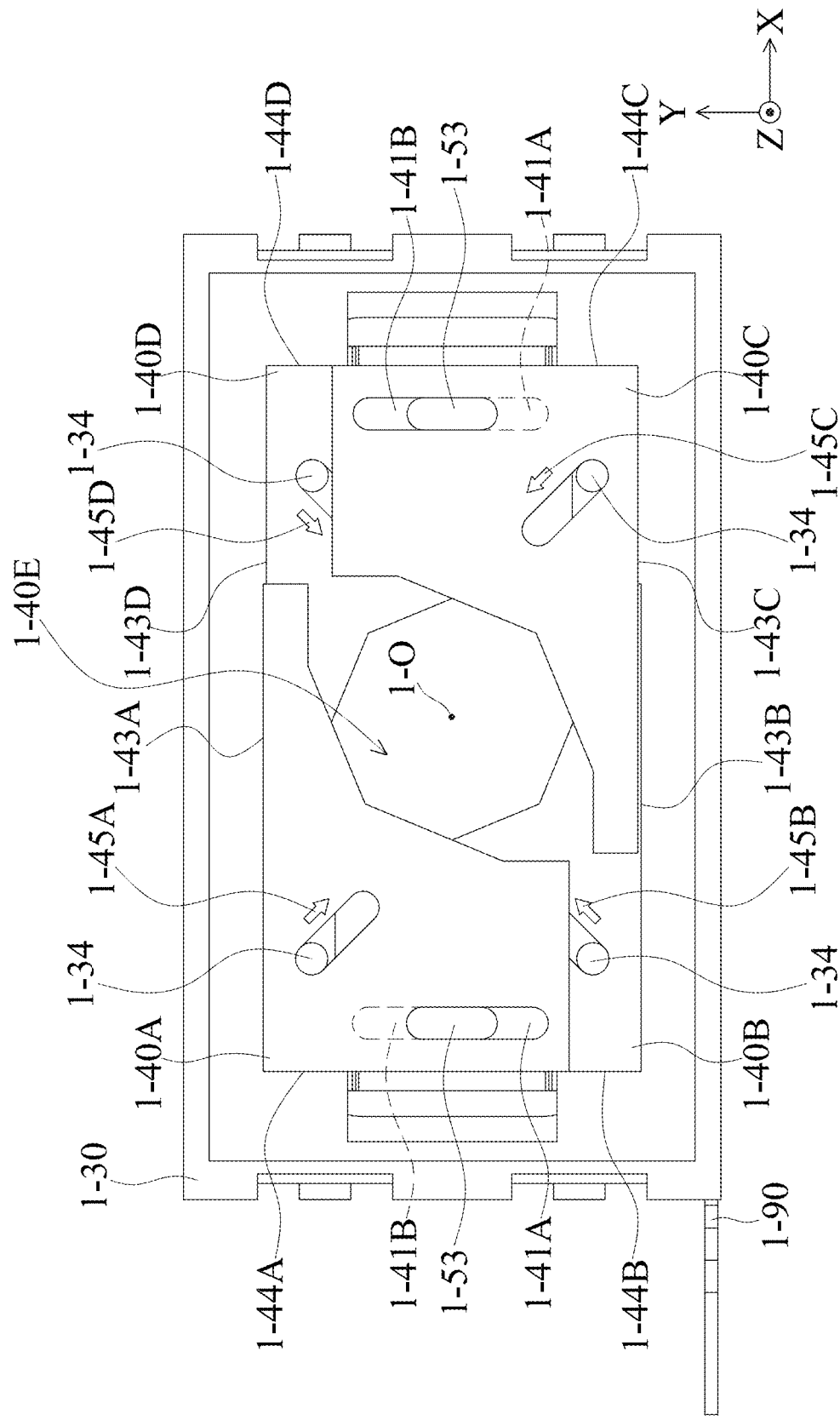
FIG. 9B is a schematic of FIG. 9A, wherein the case is omitted.

FIG. 9A is a top view of the optical element driving mechanism 1-100 when the blade assembly 1-40 is closed. FIG. 9B is a schematic view of FIG. 9A, wherein the case 1-10 is omitted. The first blade 1-40A, the second blade 1-40B, the third blade 1-40C, and the fourth blade 1-40D respectively move toward directions 1-45A, 1-45B, 1-45C, and 1-45D, as shown in the arrows in FIG. 9B. It should be noted that the two transmission elements 1-50 move in directions toward the main axis 1-O (i.e. move close to each other) to drive the blades. Therefore, the aperture opening 1-40E may shrink, so the size of the aperture formed by the optical element driving mechanism 1-100 may be adjusted.

Figure 9C:
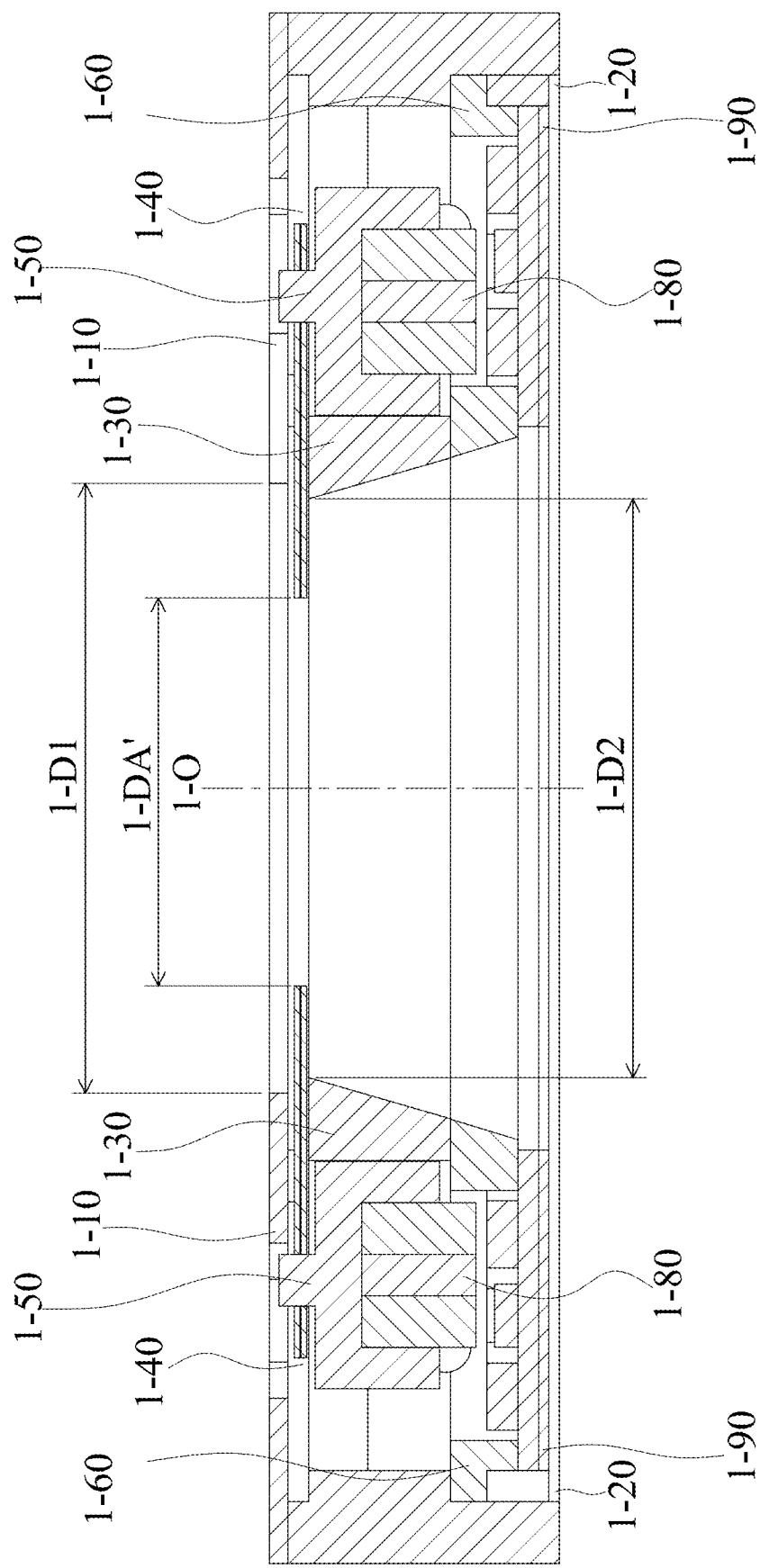
FIG. 9C is a cross-sectional view of FIG. 9A.

FIG. 9C is a cross-sectional view of FIG. 9A. As shown in FIG. 9C, the aperture opening 1-40E has a minimum diameter of 1-DA', which is less than the minimum diameter 1-D1 of the first opening and the minimum diameter 1-D2 of the second opening. In other words, the size of the aperture formed by the optical element driving mechanism 1-100 may be defined as the minimum diameter 1-DA' of the aperture opening 1-40E. In some embodiments, the minimum diameter 1-DA' may equal to zero, and the optical element driving mechanism 1-100 may act as a shutter in this condition.

Figure 10A:
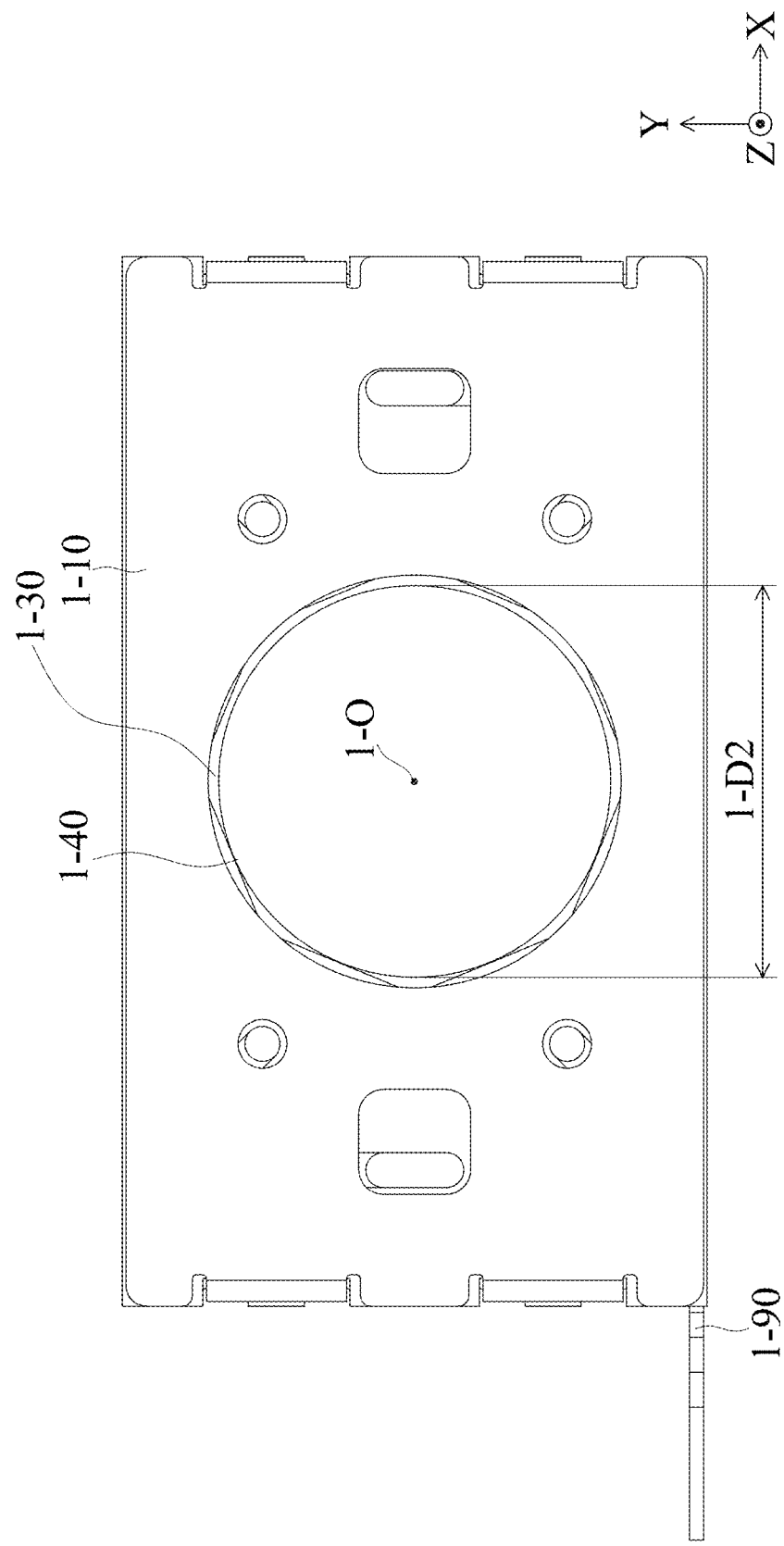
FIG. 10A is a top view of the optical element driving mechanism when the blade assembly is opened.
Figure 10B:
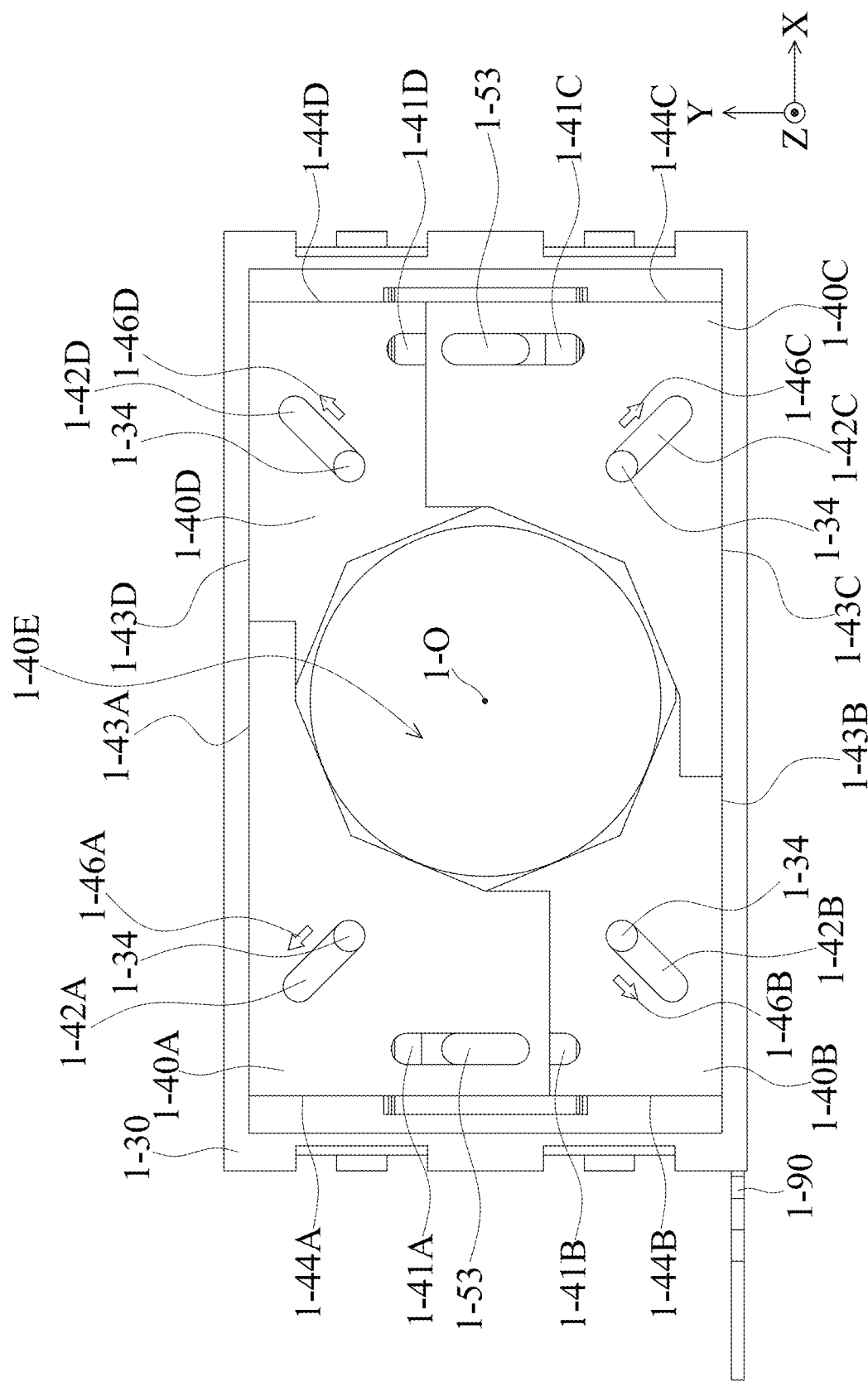
FIG. 10B is a schematic of FIG. 10A, wherein the case is omitted.

FIG. 10A is a top view of the optical element driving mechanism 1-100 when the blade assembly 1-40 is opened. FIG. 10B is a schematic view of FIG. 10A, wherein the case 1-10 is omitted. The first blade 1-40A, the second blade 1-40B, the third blade 1-40C, and the fourth blade 1-40D respectively move toward directions 1-46A, 1-46B, 1-46C, and 1-46D, as shown in the arrows in FIG. 10B. It should be noted that the two transmission elements 1-50 move in directions away from the main axis 1-O (i.e. move away to each other) to drive the blades. Therefore, the aperture opening 1-40E may enlarge, so the size of the aperture formed by the optical element driving mechanism 1-100 may be adjusted.

Figure 10C:
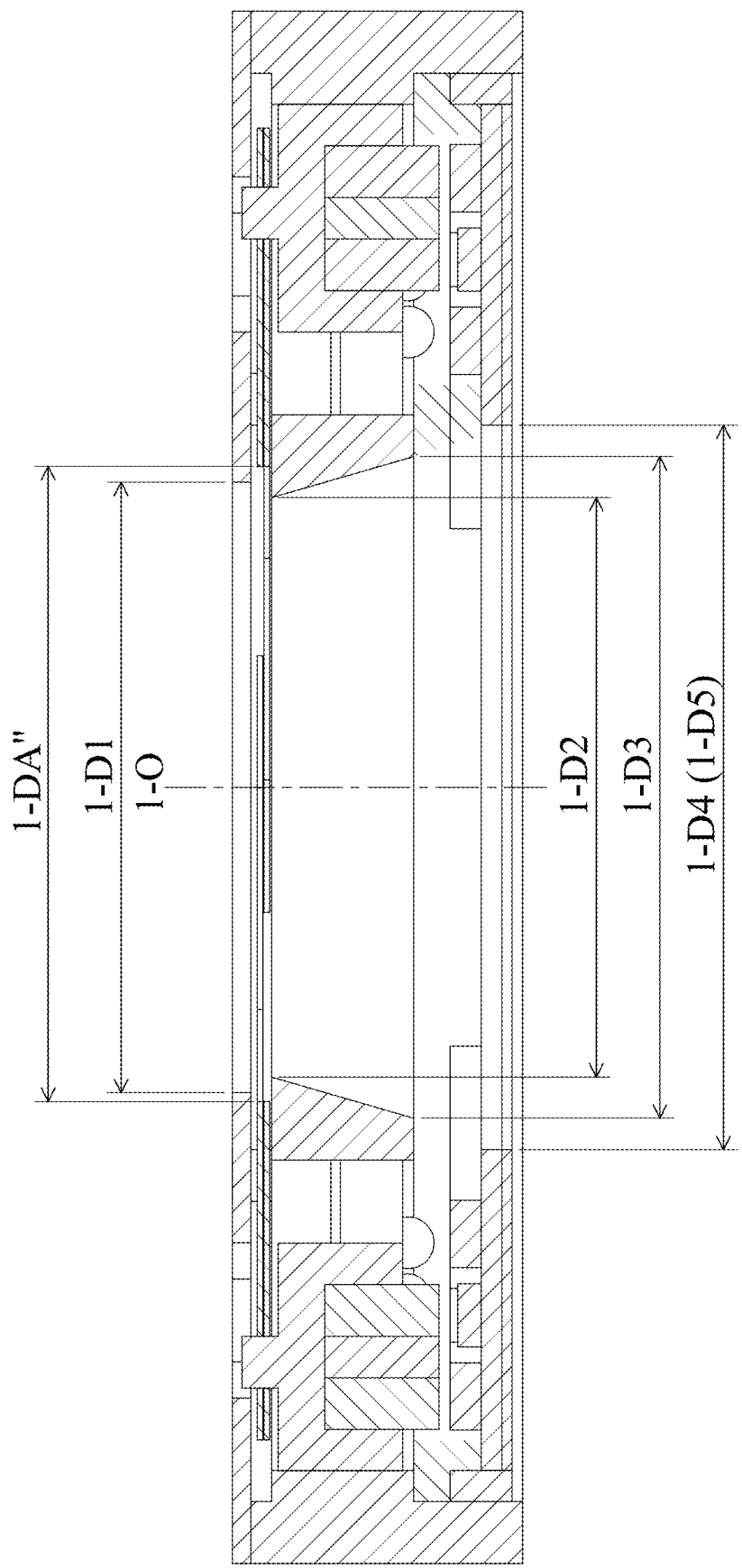
FIG. 10C is a cross-sectional view of FIG. 10A.

FIG. 10C is a cross-sectional view of FIG. 10A. As shown in FIG. 10C, the aperture opening 1-40E has a greatest diameter 1-DA", which is greater than the minimum diameter 1-D2 of the second opening. In other words, the size of the aperture formed by the optical element driving mechanism 1-100 may be defined as the minimum diameter 1-D2 of the second opening.

Figure 11:
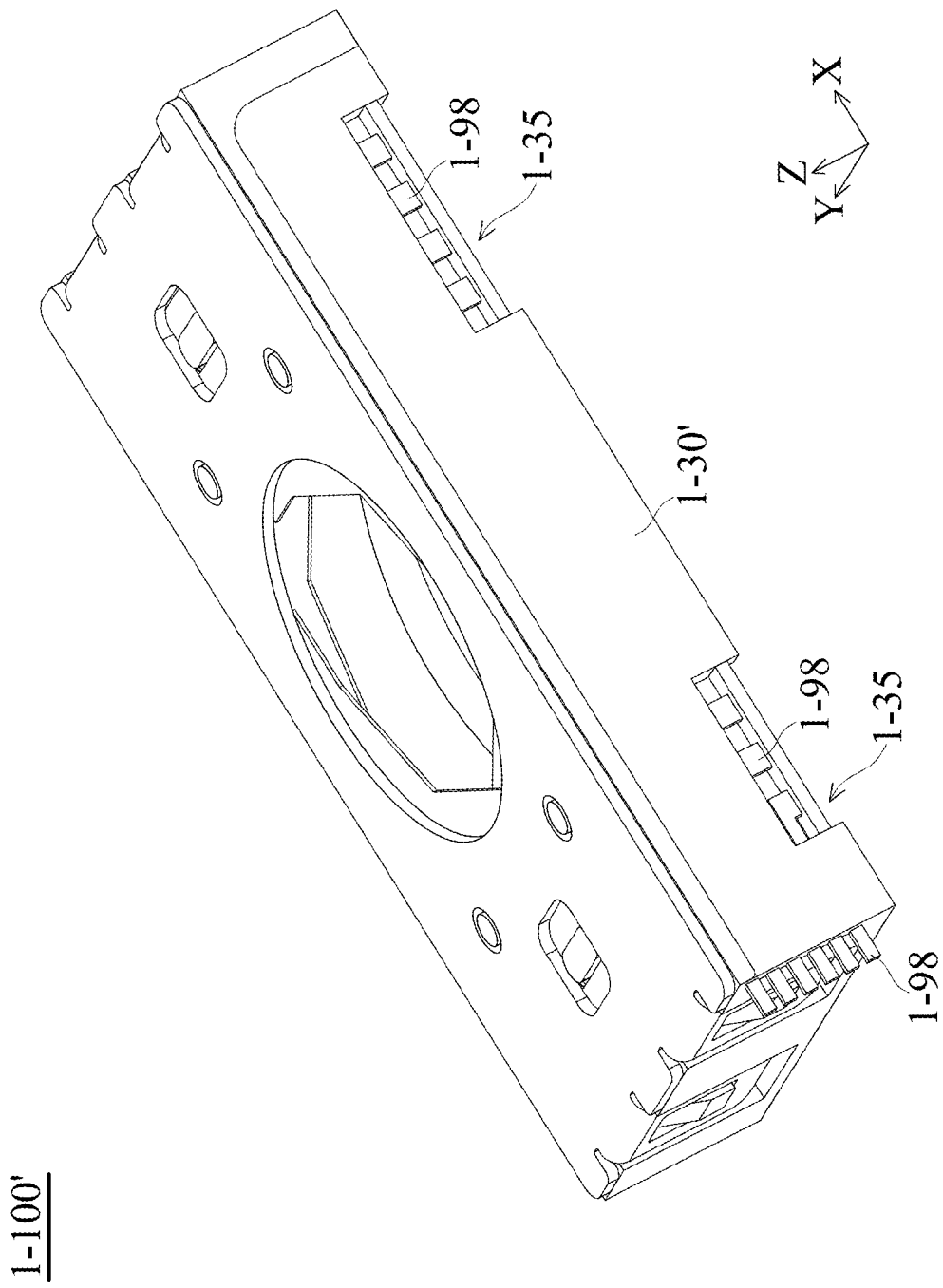
FIG. 11 and FIG. 12 are a schematic view and a exploded view of an optical element driving mechanism in other embodiments of the present disclosure, respectively.
Figure 12:
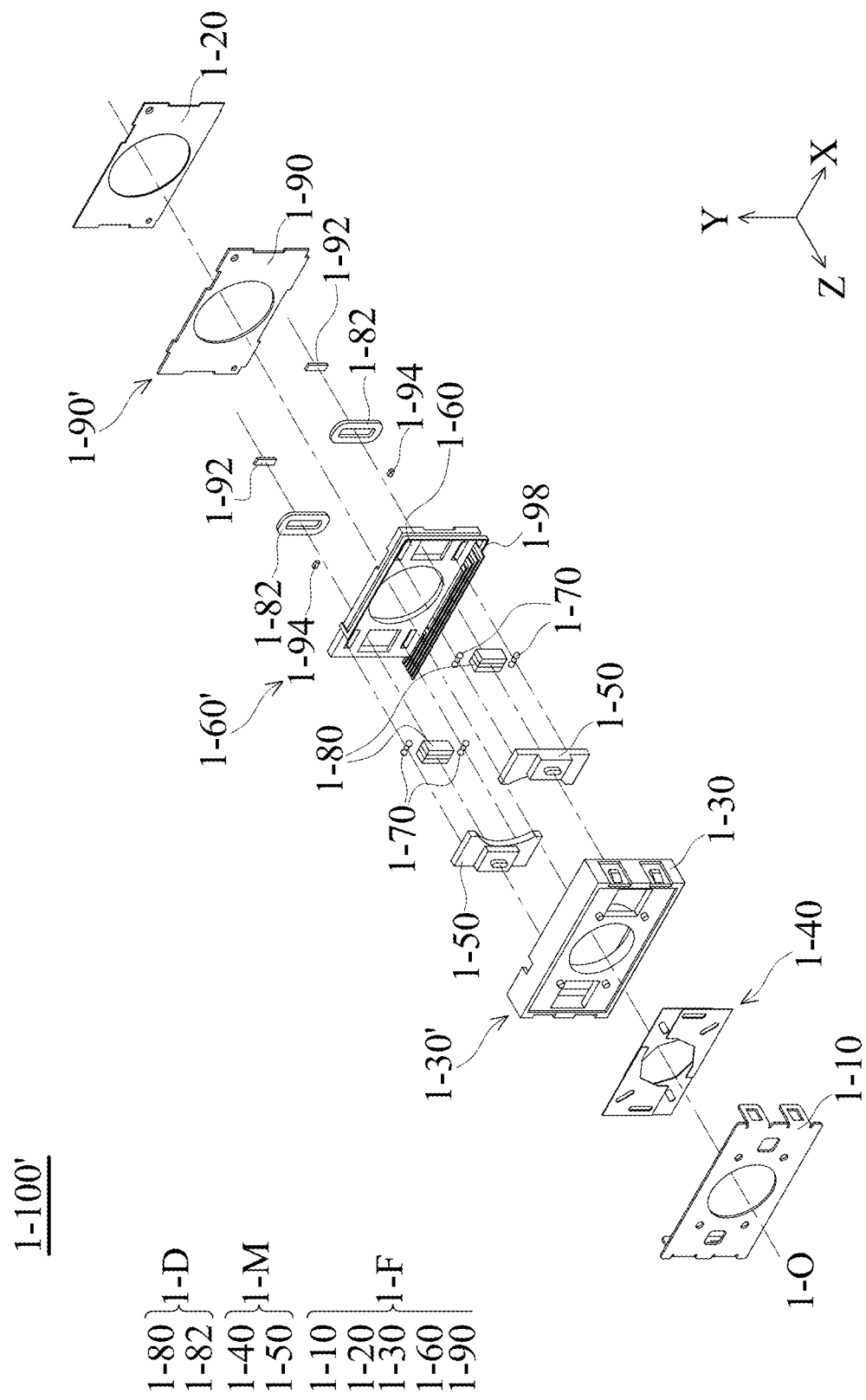

Although the circuit board 1-90 of the optical element driving mechanism 1-100 is used for connecting to other external elements, the present disclosure is not limited thereto. For example, FIG. 11 and FIG. 12 are a perspective view and an exploded view of an optical element driving mechanism 1-100' in other embodiments of the present disclosure. The elements of the optical element driving mechanism 1-100' are substantially similar or identical to the elements of the optical element driving mechanism 1-100. The difference is that the frame 1-30', the base 1-60', and the circuit plate 1-90' of the optical element 1-100' have different structures.

As shown in FIG. 11 and FIG. 12, additional conductive element 1-98 may be provided on the base 1-60'. The conductive element 1-98 may partially exposed from side openings 1-35 of the frame 1-30', and may have an end exposed from another side of the frame 1-30' to be electrically connected to external environment. It should be noted that at least a portion of the conductive element 1-98 may be embedded in the frame 1-30', and the mechanical strength of the frame 1-30' may be increased.

In summary, an optical element driving mechanism is provided. The optical element driving mechanism includes a fixed portion, a first blade, a transmission assembly, and a driving assembly. The first blade is movable relative to the fixed portion. The transmission assembly is movable relative to the fixed portion. The driving assembly is used for driving the transmission element to move relative to the fixed portion. The transmission element brings the first blade to move relative to the fixed portion when the transmission element is driven by the driving assembly.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a fixed portion, comprising a first opening, a second opening, and a third opening used for allowing light to pass through and sequentially arranged from a light incident position to a light exit position, wherein a minimum diameter of the first opening is greater than a minimum diameter of the second opening, and the minimum diameter of the second opening is less than a minimum diameter of the third opening;
   a first blade movable relative to the fixed portion;
   a transmission element movable relative to the fixed portion; and
   a driving assembly used for driving the transmission element to move relative to the fixed portion, wherein the transmission element brings the first blade to move relative to the fixed portion when the transmission element is driven by the driving assembly.

2. The optical element driving mechanism as claimed in claim 1, further comprising:
   a second blade movable relative to the fixed portion;
   a third blade movable relative to the fixed portion; and
   a fourth blade movable relative to the fixed portion;
   wherein the fixed portion further comprises:
      a fourth opening used for allowing the light to pass through;
      a fifth opening used for allowing the light to pass through;
   wherein sizes of the first opening, the second opening, the third opening, the fourth opening, and the fifth opening are different.

3. The optical element driving mechanism as claimed in claim 2, wherein:
   the third opening is closer to the light incident position than the fourth opening;
   the fourth opening is closer to the light incident position than the fifth opening;
   a main axis of the light sequentially passes through the first opening, the second opening, the third opening, the fourth opening, and the fifth opening.

4. The optical element driving mechanism as claimed in claim 3, wherein:
   the minimum diameter of the third opening is less than a minimum diameter of the fourth opening;
   the minimum diameter of the fourth opening is less than a minimum diameter of the fifth opening;
   the minimum diameter of the first opening is less than the minimum diameter of the third opening.

5. The optical element driving mechanism as claimed in claim 4, wherein:
   the first opening comprises a first opening surface facing the main axis;
   the second opening comprises a second opening surface facing the main axis;
   the third opening comprises a third opening surface facing the main axis;
   the fourth opening comprises a fourth opening surface facing the main axis;
   the fifth opening comprises a fifth opening surface facing the main axis;
   the first opening surface, the second opening surface, the third opening surface, the fourth opening surface, and the fifth opening surface are arranged in order.

6. The optical element driving mechanism as claimed in claim 5, wherein:
   the first opening surface is parallel to the main axis;
   the second opening surface is not parallel to the main axis;
   the third opening surface is not parallel to the main axis;
   the fourth opening surface is parallel to the main axis;
   the fifth opening surface is parallel to the main axis;
   when viewed in a first direction that is perpendicular to the main axis, the first opening surface is not parallel to the second opening surface.

7. The optical element driving mechanism as claimed in claim 6, wherein:
   the first blade, the second blade, the third blade, and the fourth blade form an aperture opening for the light to pass through;
   a minimum diameter of the aperture opening is less than the minimum diameter of the second opening;
   a maximum diameter of the aperture opening is greater than the minimum diameter of the second opening;
   the moving directions of the first blade, the second blade, the third blade, and the fourth blade are different.

8. The optical element driving mechanism as claimed in claim 7, wherein:
   the first blade and the third blade move in opposite directions;
   the second blade and the fourth blade move in opposite directions;
   the first blade comprises a first blade opening;
   the second blade comprises a second blade opening;
   the third blade comprises a third blade opening;
   the fourth blade comprises a fourth blade opening;
   at least a portion of the transmission element is disposed in the first blade opening, the second blade opening, the third blade opening, and the fourth blade opening.

9. The optical element driving mechanism as claimed in claim 8, wherein:
   the first blade comprises a top surface and a bottom surface;
   the second blade comprises a top surface, a bottom surface, and a recessed point;
   roughness of the top surface of the first blade is less than roughness of the bottom surface of the first blade;
   reflectivity of the top surface of the first blade is higher than reflectivity of the bottom surface of the first blade;
   roughness of the top surface of the second blade is less than roughness of the bottom surface of the second blade;

reflectivity of the top surface of the second blade is higher than reflectivity of the bottom surface of the second blade;

the recessed point of the second blade recesses to the first blade and in direct contact with the first blade;

the first blade is disposed on the second blade, and a distance between the bottom surface of the first blade and the top surface of the second blade is greater than zero.

10. The optical element driving mechanism as claimed in claim 9, further comprising an electronic assembly disposed on the fixed portion;

wherein the fixed portion comprises:
a bottom plate;
a base disposed on the bottom plate;
a frame disposed on the base; and
a case disposed on the frame;
the driving assembly comprises a magnetic element and a coil, wherein:
at least a portion of the frame is exposed from the case when viewed along the main axis;
the electronic assembly is disposed in the coil;
a distance between a top surface of the electronic assembly and the magnetic element is longer than a top surface of the coil and the magnetic element.

* * * * *